United States Patent
Terven et al.

(10) Patent No.: US 10,827,116 B1
(45) Date of Patent: Nov. 3, 2020

(54) SELF CALIBRATION SYSTEM FOR MOVING CAMERAS

(71) Applicants: Juan Ramon Terven, Queretaro (MX); Brian Bates, New Orleans, LA (US); Steve Gu, San Jose, CA (US); Kaushal Patel, Jersey City, NJ (US)

(72) Inventors: Juan Ramon Terven, Queretaro (MX); Brian Bates, New Orleans, LA (US); Steve Gu, San Jose, CA (US); Kaushal Patel, Jersey City, NJ (US)

( * ) Notice: Subject to any disclaimer, the term of this patent is extended or adjusted under 35 U.S.C. 154(b) by 0 days.

(21) Appl. No.: 16/550,291

(22) Filed: Aug. 26, 2019

(51) Int. Cl.
- *H04N 5/232* (2006.01)
- *G06K 9/00* (2006.01)
- *G06T 7/292* (2017.01)
- *G06T 7/80* (2017.01)

(52) U.S. Cl.
CPC ..... *H04N 5/23219* (2013.01); *G06K 9/00362* (2013.01); *G06T 7/292* (2017.01); *G06T 7/80* (2017.01); *G06T 2207/30196* (2013.01)

(58) Field of Classification Search
CPC ....... H04N 5/23219; G06T 7/292; G06T 7/80; G06T 2207/30196; G06K 9/00362
See application file for complete search history.

(56) References Cited

U.S. PATENT DOCUMENTS

| | | | | |
|---|---|---|---|---|
| 9,384,551 B2* | 7/2016 | Ramaswamy | ............ | G06T 7/85 |
| 9,866,820 B1* | 1/2018 | Agrawal | ............ | H04N 13/246 |
| 10,347,009 B1* | 7/2019 | Terven | ............ | G06T 7/73 |
| 10,582,186 B1* | 3/2020 | Baldwin | ............ | H04N 13/243 |
| 10,750,080 B2* | 8/2020 | Shimauchi | ............ | G03B 15/00 |
| 2008/0117290 A1* | 5/2008 | Mazza | ............ | H04N 13/296 |
| | | | | 348/47 |
| 2014/0132723 A1* | 5/2014 | More | ............ | G01S 7/497 |
| | | | | 348/46 |
| 2017/0070731 A1* | 3/2017 | Darling | ............ | G06T 7/85 |
| 2018/0020206 A1* | 1/2018 | Sheridan | ............ | H04N 13/246 |
| 2018/0061034 A1* | 3/2018 | Zhao | ............ | G01B 11/2513 |
| 2018/0285660 A1* | 10/2018 | Ohara | ............ | G06K 9/3233 |
| 2019/0197982 A1* | 6/2019 | Chi | ............ | G06T 7/85 |
| 2020/0005489 A1* | 1/2020 | Kroeger | ............ | G06K 9/4604 |

* cited by examiner

*Primary Examiner* — Chiawei Chen
(74) *Attorney, Agent, or Firm* — Jun Liu

(57) ABSTRACT

The present invention describes a system for calibrating a plurality of cameras in an area. The system functions by using moving objects to calibrate, in particular using people. In addition, the system implements automatic re-calibration in a specific way to reduce human intervention, cost and time.

15 Claims, 4 Drawing Sheets

SELF CALIBRATION SYSTEM FOR MOVING CAMERAS

BACKGROUND OF THE INVENTION

This application relates to systems, methods, devices, and other techniques for video camera self-calibration based on video information received from more than one video cameras.

Methods and apparatus for calibrating cameras in the certain areas are very common. Some methods are using reference objects and manual methods to calibrate the cameras. However, these methods need human intervention and cost time and money.

Therefore, it is desirable to have systems and methods to enable self-calibration for the cameras to save time and efforts.

SUMMARY OF THE INVENTION

This application relates to systems, methods, devices, and other techniques for video camera self-calibration based on video information received from more than one video cameras. In some embodiments, the system uses people as calibration markers. Instead of finding feature matches between cameras, the system matches one or more persons between cameras. Then the system identifies certain body key points of the one or more persons and then matches these key points. In addition, the system implements automatic re-calibration in a specific way to reduce human intervention, cost and time. In some embodiments, the system extracts detections from each camera, and then synchronizes frames using time-stamp, and then clusters one or more persons using re-id features. The system then aggregates key points from one or more persons along time for each camera. The system then finds matches same time, same person key points on camera pairs and then runs un-calibrated structure from motion on the key point matches. The system then aligns and upgrades scale using one or more persons' head and feet key points or the known camera height.

In some embodiments, the system implements a self-healing scheme to recalibrate after these situations (but not limited to these situations): accidental or on purpose camera position changes, change of focus or aspect ratio, or camera upgrades.

When the system uses this self-healing scheme, the system uses multi-camera tracking to match people and key points. Then the system triangulates and projects key point coordinates. The system monitors accumulated errors over time. If the accumulated error is large, re-calibration is needed. If re-calibration is needed, the system runs people-based calibration.

In some implementations, this kind of system synchronizes system time for the plurality of cameras. Then the system detects an object moving along a route within the area and then detects feature points on the object. Then the system captures a first set of one or more images of the feature points of the object along the route by a first one of the plurality of cameras and a second set of one or more images of the feature points of the object along the route by a second one of the plurality of cameras. Time stamp is recorded for each capturing. Then the system calibrates the first one of the plurality of cameras and the second one of the plurality of cameras by matching same feature points on the object between the first set of one or more images of the object and the second set of one or more images of the object at same time stamp.

In some embodiments, the object is a person. In some embodiments, the method is conducted by a predetermined time interval. In some embodiments, the first one of the plurality of cameras and the second one of the plurality of cameras need at least 50% overlap in terms of their field of vision.

In some embodiments, the present invention describes a method for calibrating a plurality of cameras in an area. The system synchronizes system time for the plurality of cameras. The system also identifying feature points of an object moving within the area. The system also captures a first set of one or more images of the feature points during the object's movement by a first one of the plurality of cameras. The system also captures a second set of one or more images of the feature points during the object's movement by a second one of the plurality of cameras, wherein the first set of one or more images and the second set of one or more images are captured at same time, wherein time stamp is created for each capturing. The system then identifies the feature points on the object by utilizing a neural network and matches same feature points between the first set of one or more images and the second set of one or more images at same time stamp. In some embodiments, the first object is a person. In some embodiments, one of the feature points is the person's head. In some embodiments, the position information of the same feature points is X and Y coordinates within an image. In some embodiments, the object is configured to move freely.

In some embodiments, the invention is related to a system for calibrating a plurality of cameras in an area. The system comprises a controlling unit. The system also includes a first camera of the plurality of cameras coupled to the controlling unit, wherein the first camera is configured to identify one or more feature points of an object moving within the area, wherein the first camera is configured to capture a series of images of the object at a set of time slots. The system comprises a second camera of the plurality of cameras coupled to the controlling unit, wherein the second camera has same system time as in the first camera, wherein the second camera is configured to identify the one or more feature points of the object moving within the area, wherein the second camera is configured to capture another series of images of the object at the set of time slots, wherein the controlling unit calibrates the first camera and the second camera to match relative movement of the one or more feature points of the object between the series of images and the another series of images for same time slot within the set of time slots.

In some embodiment, the system comprises a storage unit coupled to the controlling unit, wherein images produced by the plurality of cameras are stored in the storage unit. In some embodiment, the system comprises a neural network coupled to the controlling unit, wherein the neural network is configured to match and identify the feature points. In some embodiments, the controlling unit tunes position and angle of the first camera and the second camera, wherein the first and the second camera has ability to pan, tilt and zoom. In some embodiments, the controlling unit sends command to the first camera and the second camera, wherein the first camera and the second camera tune themselves internally based on the commands. In some embodiments, the system re-calibrates a subset of the plurality of cameras after a time period.

In some embodiments, the system continuously monitors reprojection error of triangulated points from the first camera and the second camera, when the re-projection error consistently exceeds a certain value after some time.

In some embodiments, A system comprises a controlling unit, a first camera of the plurality of cameras coupled to the controlling unit, wherein the first camera is configured to identify one or more feature points of an object moving within the area, wherein the first camera is configured to capture a series of images of the object at a set of time slots, wherein the first camera is a free moving camera, wherein the feature points are attached to the object intentionally, wherein the feature points are configured to be self-recognizable with pre-determined shapes. The system also comprises a second camera of the plurality of cameras coupled to the first camera, wherein the second camera has same system time as in the first camera, wherein the second camera is configured to identify the one or more feature points of the object moving within the area, wherein the second camera is configured to capture another series of images of the object at the set of time slots, wherein the first camera and the second camera is calibrated by matching relative movement of the one or more feature points of the object between the series of images and the another series of images for same time slot within the set of time slots, wherein the second camera is a free moving camera.

In some embodiments, a method related to the calibration of cameras comprises these steps: Synchronizing system time for the plurality of cameras; Detecting an object moving along a route within the area; Detecting an object with feature points moving along a route within the area, wherein the feature points are attached to the object intentionally, wherein the feature points are configured to be self-recognizable with pre-determined shapes; Capturing a first set of one or more images of the feature points of the object along the route by a first one of the plurality of cameras and a second set of one or more images of the feature points of the object along the route by a second one of the plurality of cameras, wherein time stamp is recorded for each capturing; Calibrating the first one of the plurality of cameras and the second one of the plurality of cameras by matching same feature points on the object between the first set of one or more images of the object and the second set of one or more images of the object at same time stamp; Monitoring re-projection errors of triangulated points from the first one of the plurality of cameras and the second one of the plurality of cameras; and Recalibrating the first one of the plurality of cameras or the second one of the plurality of cameras when any of the re-projection errors exceeds a certain value.

In some embodiments, a method related to the calibration of cameras comprises these steps: Synchronizing system time for the plurality of cameras; Identifying feature points of an object moving within the area; Capturing a first set of one or more images of the feature points during the object's movement by a first one of the plurality of cameras; Capturing a second set of one or more images of the feature points during the object's movement by a second one of the plurality of cameras, wherein the first set of one or more images and the second set of one or more images are captured at same time, wherein time stamp is created for each capturing; Identifying the feature points on the object by utilizing a neural network; and Matching same feature points between the first set of one or more images and the second set of one or more images at same time stamp; Calculating re-projection errors of triangulated points from the first one of the plurality of cameras and the second one of the plurality of cameras; Identifying one camera that has largest re-projection error among the re-projection errors of triangulated points from the first one of the plurality of cameras and the second one of the plurality of cameras; and recalibrating the one camera by projecting its position from the position of the feature points of the object.

These and other aspects, their implementations and other features are described in details in the drawings, the description and the claims.

DETAILED DESCRIPTION OF THE INVENTION

Figure 1:
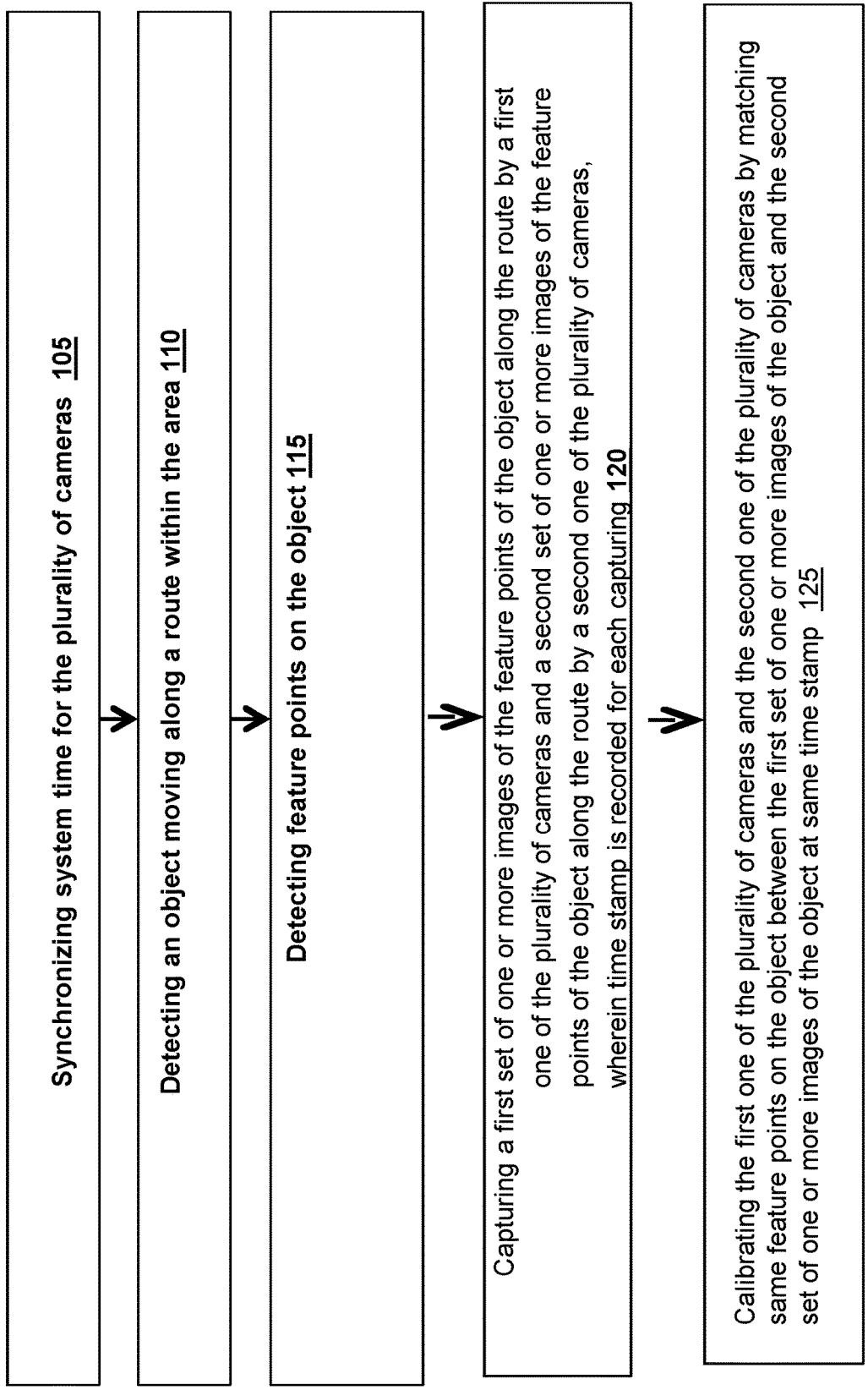
FIG. 1 shows a method for self-calibrating a plurality of cameras in an area.

FIG. 1 shows a method for self-calibrating a plurality of cameras in an area. In some implementations, the method comprises a step 105 of synchronizing system time for the plurality of cameras.

In some embodiments, the method comprises a step 110 of detecting an object moving along a route within the area.

In some embodiments, the method comprises a step 115 of detecting feature points on the object.

In some embodiments, the method comprises a step 120 of capturing a first set of one or more images of the feature points of the object along the route by a first one of the plurality of cameras and a second set of one or more images of the feature points of the object along the route by a second one of the plurality of cameras, wherein time stamp is recorded for each capturing.

In some embodiments, the method comprises a step 125 of calibrating the first one of the plurality of cameras and the second one of the plurality of cameras by matching same feature points on the object between the first set of one or more images of the object and the second set of one or more images of the object at same time stamp.

In some embodiments, the object is a person. In some embodiments, the method is conducted by a predetermined time interval. In some embodiments, the first one of the plurality of cameras and the second one of the plurality of cameras need at least 50% overlap in terms of their field of vision.

Figure 2:
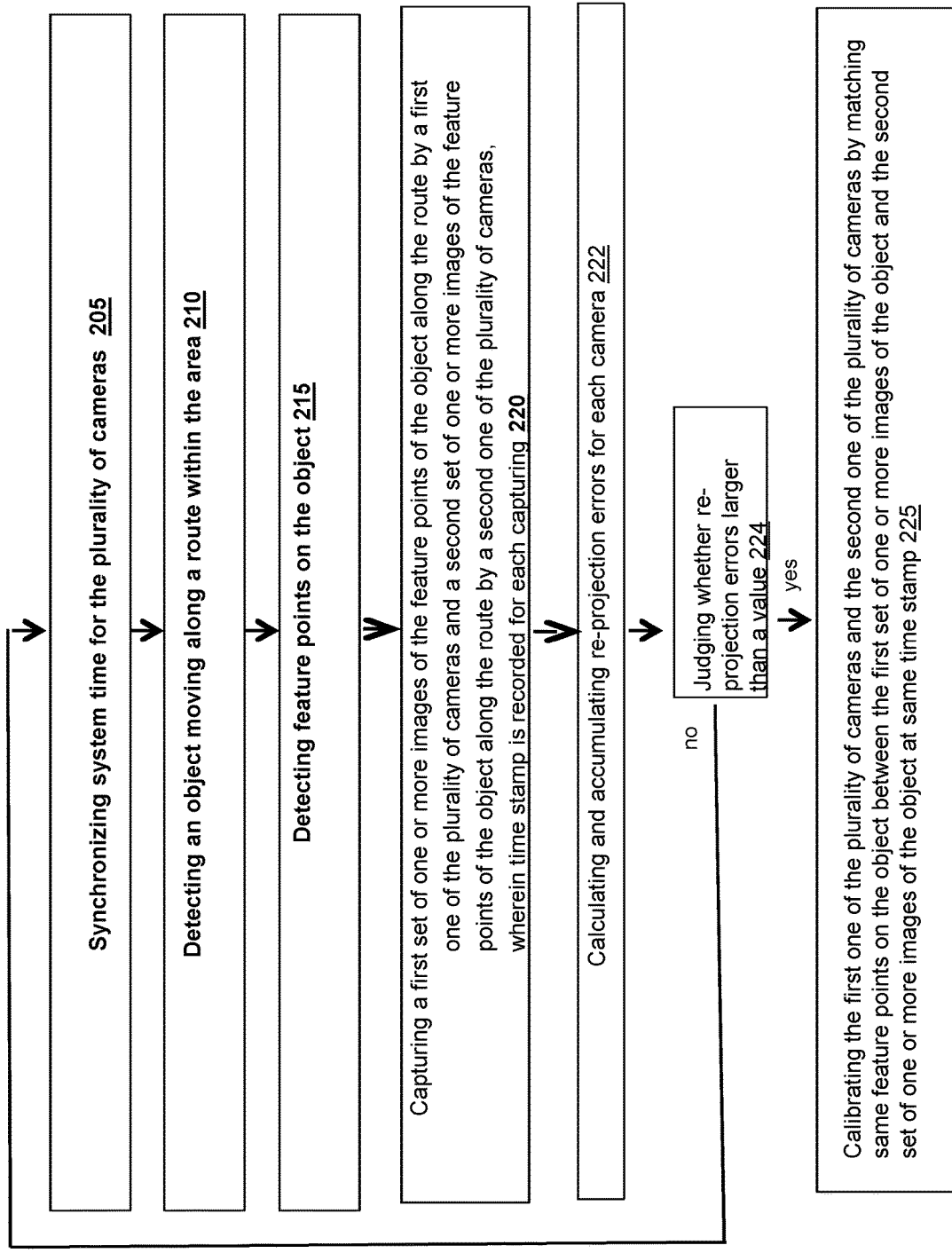
FIG. 2 shows another method for calibrating a plurality of cameras in an area.

FIG. 2 shows a method for self-calibrating a plurality of cameras in an area. In some implementations, the method comprises a step 205 of synchronizing system time for the plurality of cameras.

In some embodiments, the method comprises a step 210 of detecting an object moving along a route within the area.

In some embodiments, the method comprises a step 215 of detecting feature points on the object.

In some embodiments, the method comprises a step 220 of capturing a first set of one or more images of the feature points of the object along the route by a first one of the plurality of cameras and a second set of one or more images of the feature points of the object along the route by a second one of the plurality of cameras, wherein time stamp is recorded for each capturing.

In some embodiments, the method comprises a step 222 of calculating and accumulating re-projection errors for each camera.

In some embodiments, the method comprises a step 224 of judging whether re-projection value is larger than a value.

In some embodiments, when the re-projection value is larger than the value, the method comprises a step 225 of calibrating the first one of the plurality of cameras and the second one of the plurality of cameras by matching same feature points on the object between the first set of one or more images of the object and the second set of one or more images of the object at same time stamp.

In some embodiments, when the re-projection value is not larger than the value, the method repeats from a step 205.

In some embodiments, the object is a person. In some embodiments, the method is conducted by a predetermined time interval. In some embodiments, the first one of the plurality of cameras and the second one of the plurality of cameras need at least 50% overlap in terms of their field of vision.

Figure 3:
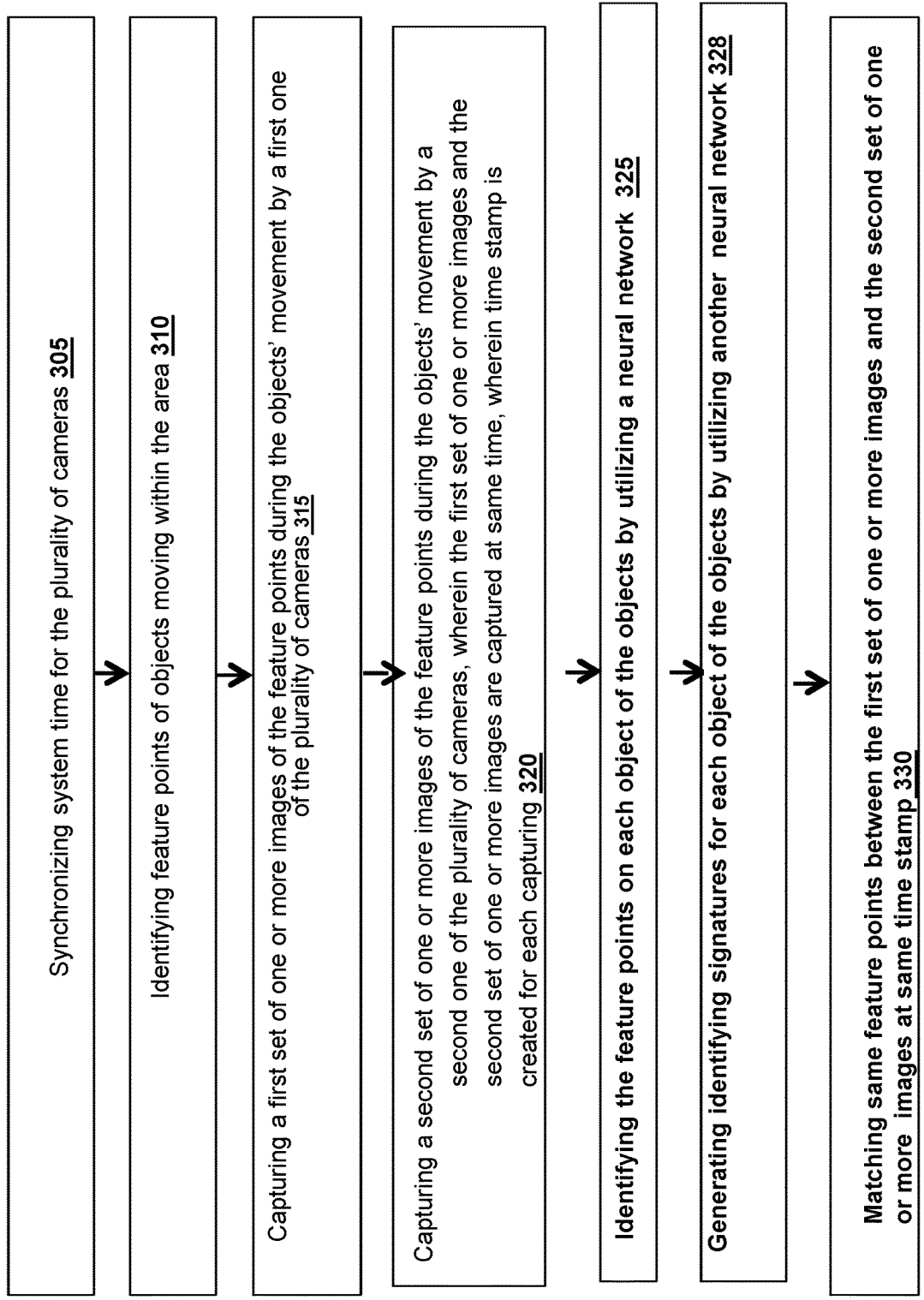
FIG. 3 shows a third method for calibrating a plurality of cameras in an area.

FIG. 3 shows another method for calibrating a plurality of cameras in an area.

In some embodiments, the method comprises a step 305 of synchronizing system time for the plurality of cameras.

In some embodiments, the method comprises a step 310 of identifying feature points of an object moving within the area.

In some embodiments, the method comprises a step 315 of capturing a first set of one or more images of the feature points during the object's movement by a first one of the plurality of cameras.

In some embodiments, the method comprises a step 320 of capturing a second set of one or more images of the feature points during the object's movement by a second one of the plurality of cameras, wherein the first set of one or more images and the second set of one or more images are captured at same time, wherein time stamp is created for each capturing.

In some embodiments, the method comprises a step 325 of identifying the feature points on the object by utilizing a neural network.

In some embodiments, the method comprises a step 328 of generating identifying signatures for each object of the objects by utilizing another neural network.

In some embodiments, the method comprises a step 330 of matching same feature points between the first set of one or more images and the second set of one or more images at same time stamp.

In some embodiments, the first object is a person. In some embodiments, one of the feature points is the person's head. In some embodiments, the position information of the same feature points is X and Y coordinates within an image. In some embodiments, the object is configured to move freely.

Figure 4:
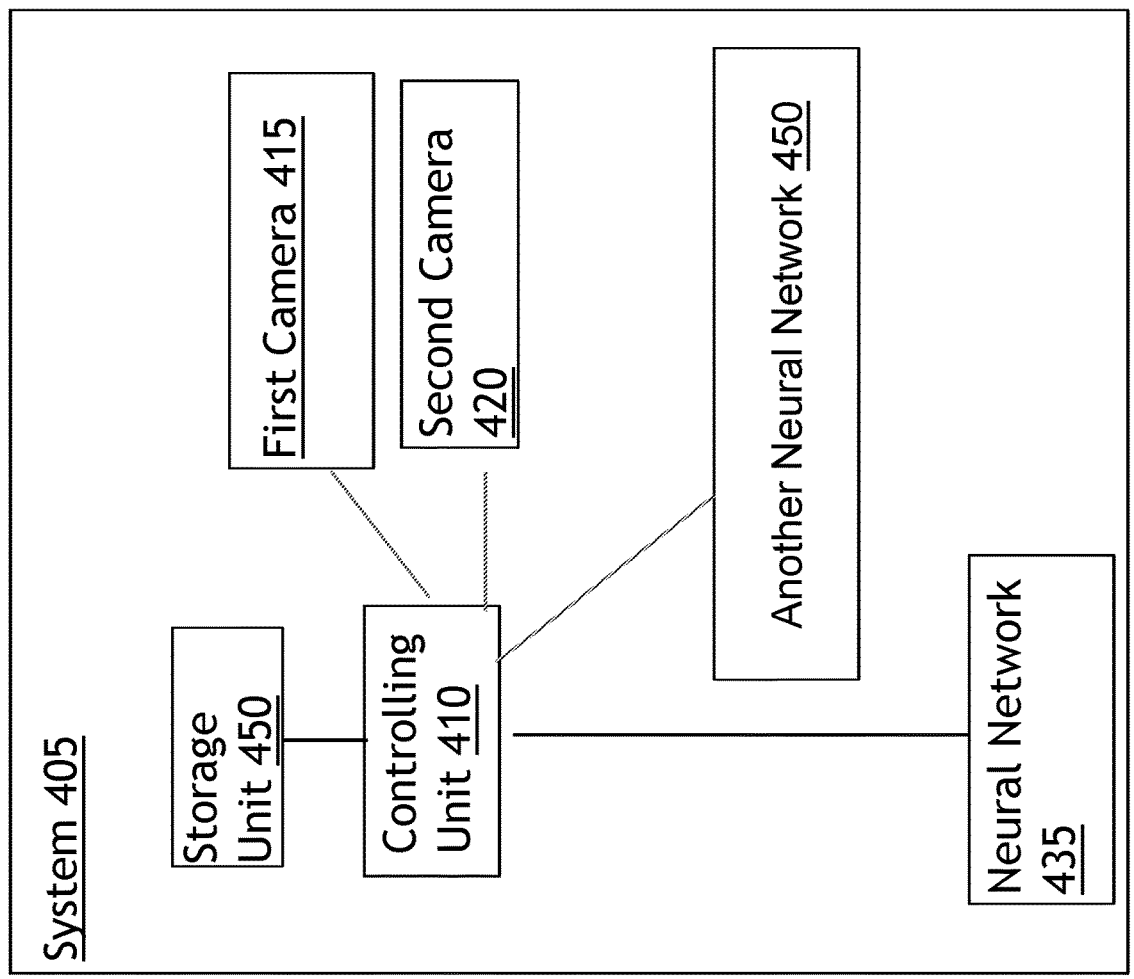
FIG. 4 shows a system for calibrating a plurality of cameras in an area.

FIG. 4 shows a system for calibrating a plurality of cameras in an area.

In some embodiment, the system 405 comprises a storage unit 450 coupled to a controlling unit 410, wherein images produced by the plurality of cameras are stored in the storage unit.

In some embodiment, a first camera 415 of the plurality of cameras is coupled to the controlling unit 410, wherein the first camera 415 is configured to identify one or more feature points of an object moving within the area, wherein the first camera 415 is configured to capture a series of images of the object at a set of time slots.

In some embodiment, a second camera 420 of the plurality of cameras is coupled to the controlling unit 410, wherein the second camera 420 has same system time as in the first camera 415, wherein the second camera 420 is configured to identify the one or more feature points of the object moving within the area, wherein the second camera 420 is configured to capture another series of images of the object at the set of time slots, wherein the controlling unit 310 calibrates the first camera 415 and the second camera 420 to match relative movement of the one or more feature points of the object between the series of images and the another series of images for same time slot within the set of time slots.

In some embodiment, the system comprises a neural network 435 coupled to the controlling unit 410, wherein the neural network 435 is configured to match and identify the feature points. In some embodiments, the controlling unit 410 tunes position and angle of the first camera 415 and the second camera 420, wherein the first and the second camera has ability to pan, tilt and zoom. In some embodiments, the controlling unit 410 sends command to the first camera 415 and the second camera 420, wherein the first camera 415 and the second camera 420 tunes themselves internally based on the commands. In some embodiments, the system re-calibrates a subset of the plurality of cameras after a time period.

In some embodiments, the system continuously monitors reprojection error of triangulated points from the first camera 415 and the second camera 420, wherein the system initiates a recalibration when the re-projection error exceeds a certain value.

In some embodiment, the system comprises another neural network 450 coupled to the controlling unit 410, wherein the neural network 450 is configured to identify signatures of each object within the objects.

The invention claimed is:

1. A method for calibrating a plurality of cameras in an area, comprising:
    synchronizing a system time for the plurality of cameras;
    detecting an object moving along a route within the area;
    detecting the object with feature points moving along a route within the area, wherein the feature points are attached to the object intentionally, wherein the feature points are configured to be self-recognizable with predetermined shapes;
    capturing a first set of one or more images of the feature points of the object along the route by a first one of the plurality of cameras and a second set of one or more images of the feature points of the object along the route by a second one of the plurality of cameras, wherein a time stamp is recorded for each capturing;
    calibrating the first one of the plurality of cameras and the second one of the plurality of cameras by matching same feature points on the object between the first set of one or more images of the object and the second set of one or more images of the object at a same time stamp;
    monitoring re-projection errors of triangulated points from the first one of the plurality of cameras and the second one of the plurality of cameras; and
    recalibrating the first one of the plurality of cameras or the second one of the plurality of cameras when any of the re-projection errors exceeds a certain value.

2. The method for calibrating a plurality of cameras in an area of claim 1, wherein the object is a person.

3. The method for calibrating a plurality of cameras in an area of claim 1, wherein the method is conducted by a predetermined time interval.

4. The method for calibrating a plurality of cameras in an area of claim 1, wherein the first one of the plurality of cameras and the second one of the plurality of cameras need at least 50% overlap in terms of their field of vision.

5. A method for calibrating a plurality of cameras in an area, comprising:
synchronizing a system time for the plurality of cameras;
identifying feature points of an object moving within the area;
capturing a first set of one or more images of the feature points during the object's movement by a first one of the plurality of cameras;
capturing a second set of one or more images of the feature points during the object's movement by a second one of the plurality of cameras, wherein the first set of one or more images and the second set of one or more images are captured at a same time, wherein a time stamp is created for each capturing;
identifying the feature points on the object by utilizing a neural network; and
matching a same set of feature points between the first set of one or more images and the second set of one or more images at the same time stamp;
calculating re-projection errors of triangulated points from the first one of the plurality of cameras and the second one of the plurality of cameras;
identifying one camera that has a largest re-projection error among the re-projection errors of triangulated points from the first one of the plurality of cameras and the second one of the plurality of cameras; and
recalibrating the one camera by projecting its position from the position of the feature points of the object.

6. The method for calibrating a plurality of cameras in an area of claim 5, wherein the object is a person.

7. The method for calibrating a plurality of cameras in an area of claim 6, wherein one of the feature points is the person's head.

8. A method for calibrating a plurality of cameras in an area of claim 5, wherein the position information of the same set of feature points is X and Y coordinates within an image.

9. The method for calibrating a plurality of cameras in an area of claim 5, wherein the object is configured to move freely.

10. A system for calibrating a plurality of cameras in an area, comprising:
a controlling unit;
a first camera of the plurality of cameras coupled to the controlling unit, wherein the first camera is configured to identify one or more feature points of an object moving within the area, wherein the first camera is configured to capture a series of images of the object at a set of time slots, wherein the first camera is a free moving camera, wherein the feature points ~3~ are attached to the object intentionally, wherein the feature points are configured to be self-recognizable with pre-determined shapes; and
a second camera of the plurality of cameras coupled to the first camera, wherein the second camera has a same system time as in the first camera, wherein the second camera is configured to identify the one or more feature points of the object moving within the area, wherein the second camera is configured to capture another series of images of the object at the set of time slots, wherein the first camera and the second camera is calibrated by matching relative movement of the one or more feature points of the object between the series of images and the another series of images for same time slot within the set of time slots, wherein the second camera is a free moving camera.

11. The system for calibrating a plurality of cameras in an area of claim 10, further comprising:
a storage unit coupled to the controlling unit, wherein images produced by the plurality of cameras are stored in the storage unit.

12. The system for calibrating a plurality of cameras in an area of claim 10, further comprising:
a neural network coupled to the controlling unit, wherein the neural network is configured to match and identify the feature points.

13. The system for calibrating a plurality of cameras in an area of claim 10, wherein the controlling unit tunes a position and angle of the first camera and the second camera, wherein the first and the second camera has an ability to pan, tilt and zoom.

14. The system for calibrating a plurality of cameras in an area of claim 10, wherein the controlling unit sends commands to the first camera and the second camera, wherein the first camera and the second camera tune themselves internally based on the commands.

15. The system for calibrating a plurality of cameras in an area of claim 10, wherein the system re-calibrates a subset of the plurality of cameras after a time period.

* * * * *